United States Patent [19]

Schorr

[11] Patent Number: 4,607,141

[45] Date of Patent: Aug. 19, 1986

[54] ACTIVE NETWORK TERMINATION CIRCUIT

[75] Inventor: Ian A. Schorr, Chicago, Ill.

[73] Assignee: Rockwell International Corporation, El Segundo, Calif.

[21] Appl. No.: 586,531

[22] Filed: Mar. 5, 1984

[51] Int. Cl.⁴ .............................................. H04B 1/76
[52] U.S. Cl. .................................................... 179/16 F
[58] Field of Search ....... 179/170 NC, 170 G, 170 D, 179/170 R, 16 F, 16 AA; 178/45, 69 B, 69 C, 69 E, 69 F; 333/213, 214, 32; 328/128; 307/490, 494

[56] References Cited

U.S. PATENT DOCUMENTS

| | | | |
|---|---|---|---|
| 2,957,944 | 10/1960 | De Monte | 333/32 X |
| 3,622,713 | 11/1971 | Lassaigne | 179/170 NC |
| 3,919,502 | 11/1975 | Daryanani | 179/170 D |
| 4,100,515 | 7/1978 | Gupta | 333/80 R |
| 4,140,881 | 2/1979 | Clenney | 179/16 F |
| 4,357,494 | 11/1982 | Chambers, Jr. | 179/16 F |

Primary Examiner—Gene Z. Rubinson
Assistant Examiner—R. Vaas
Attorney, Agent, or Firm—C. B. Patti; V. Lawrence Sewell; H. Fredrick Hamann

[57] ABSTRACT

This disclosure depicts an active network for providing a virtual impedance to a voice frequency loaded pair having tip and ring terminals. The network comprises means for providing a predetermined capacitance between the tip terminal and ground and between the ring terminal and ground and has a variable resistive means. The means has a first input operatively connected to the tip terminal and a second input operatively connected to the ring terminal and also has first and second outputs. First and second fixed resistive means are operatively connected between the first output and the tip terminal and the second output and the ring terminal, respectively. The value of the predetermined capacitance is determined by the first and second fixed resistive means and the variable resistive means in the means for providing a predetermined capacitance.

3 Claims, 2 Drawing Figures

ACTIVE NETWORK TERMINATION CIRCUIT

BACKGROUND OF THE INVENTION

This invention relates in general to an active network for use as a build out capacitor circuit, and in particular, to a circuit for producing a variable virtual capacitance from an active network using fixed and variable resistances. In VF telephone transmission a build-out capacitor is frequently used to build-out an end section of a loaded transmission line. Such loading schemes, which are well known in the prior art, are used to extend the useable distance between a central office and a subscriber.

In telephone systems, the ideal near end section length and far end section length, i.e., the length of transmission line between central office and a first loading coil and the length of transmission line between a last loading coil and a subscriber, respectively, is equal to one half of the nominal load coil spacing. Such configuration would require the total length of transmission line between the central office and the subscriber to be a multiple of coil spacing. Since a telephone company has no control over the distance between the central office and the subscriber, the near end section can have any length between zero and full section spacing.

A shunt capacitor, referred to as a Build Out Capacitor (BOC) terminates the cable pair at the central office side and "builds out" the near end section to a full length section. The telephone line must be balanced so that the impedance between the tip terminal and ground is the same as the impedance between the ring terminal and ground. Any imbalance would cause a substantial noise pickup from adjacent power lines or other sources of undesired signals. The construction and operation of such a structure is well known in the prior art.

Standard practice is to use build out capacitors in which a large number of capacitors in binary progression are switched in and out in various combinations to achieve the desired value.

For N capacitor switch combinations, $2^N$ build out capacitor combination values could be implemented. Such a method of implementing build out capacitance is expensive and space consuming. It is also not practical for logic control or other forms of electronic control The present invention overcomes the problem in the prior art of using a large number of individual capacitors. A novel compact active network produces a variable capacitance to replace the prior art circuits.

SUMMARY OF THE INVENTION

The present invention involves an active network for providing a virtual impedance to a voice frequency loaded pair having tip and ring terminals. The network comprises means for providing a predetermined virtual capacitance between the tip terminal and ground and between the ring terminal and ground and has a variable resistive means. The means has a first input operatively connected to the tip terminal and a second input operatively connected to the ring terminal and also has first and second outputs. First and second fixed resistive means are operatively connected between the first output and the tip terminal and the second output and the ring terminal, respectively. The value of the predetermined virtual capacitance is determined by the first and second fixed resistive means and the variable resistive means in the means for providing a predetermined virtual capacitance.

OBJECTS OF THE INVENTION

It is a primary object of the present invention to provide an improved virtual impedance network for use with a voice frequency loaded pair.

It is a further object of the present invention to provide a circuit which provides a variable virtual capacitance from a fixed resistance and a variable resistance.

It is another object to provide a virtual impedance network which is economical to manufacture.

BRIEF DESCRIPTION OF THE DRAWINGS

The features of the present invention which are believed to be novel are set forth with particularity in the appended claims. The invention, together with further objects and advantages may best be understood by reference to the following description taken in conjunction with the accompanying drawings, in the several figures of which like reference numerals identify like elements, and in which:

DESCRIPTION OF THE PREFERRED EMBODIMENT

A plurality of capacitors is typically used in the prior art to build-out any end section to a nominal full-length end section of a voice frequency loaded pair. The present invention provides a novel solution which employs an active network using fixed and variable resistors to produce a predetermined capacitance.

In general, the network comprises a means for providing a predetermined virtual capacitance between the tip terminal and virtual ground and between the ring terminal and virtual ground of the voice frequency loaded pair. The means has a first input operatively connected to the tip terminal and a second input operatively connected to the ring terminal. The means also has first and second outputs. First and second resistive means are operatively connected between the first output and the tip terminal and the second output and the ring terminal, respectively.

The value of the predetermined virtual capacitance is determined by the first and second resistive means and the variable resistance in the means for providing a predetermined capacitance or proper transfer function. In the preferred embodiment, the second resistive means is equal to the first resistive means and the means for providing a proper transfer function has a fixed capacitance means.

Figure 1:
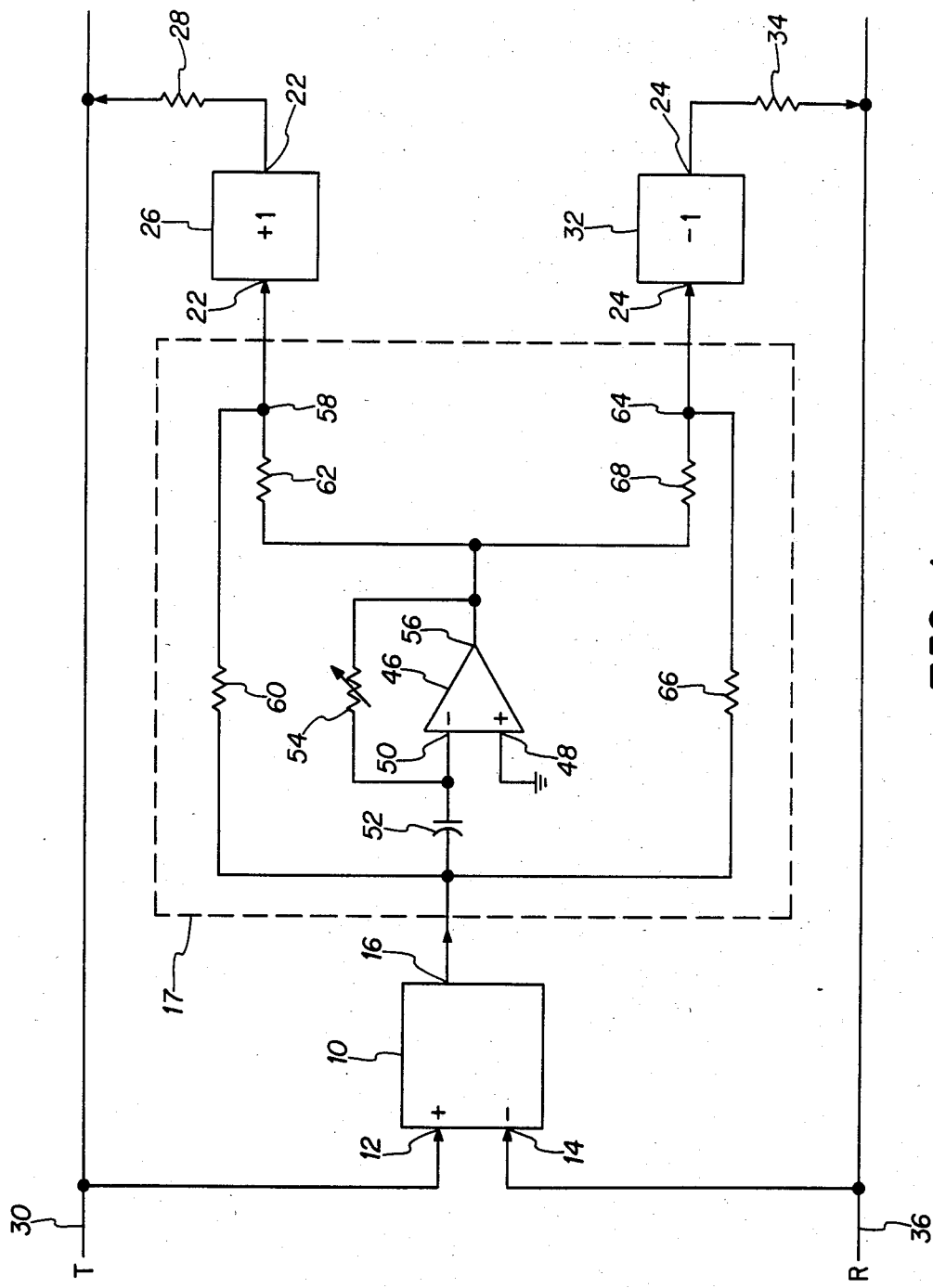
FIG. 1 illustrates the present invention in block diagram form.

As shown in FIG. 1, a means 10 for comparing (such as a differential amplifier) has a noninverting input 12 operatively connected to the tip terminal T and an inverting input 14 operatively connected to the ring terminal R. The means 10 has an output 16.

An amplifier means 17 has an input 18 operatively connected to the output 16 of means 10 and has two outputs, a tip output 22 and a ring output 24. An amplifier means 26, in series with a first resistor 28, is operatively connected between the tip output 22 and the tip terminal 30. An inverter means 32, in series with a second resistor 34, is operatively connected between the ring output 24 and the ring terminal 36.

Figure 2:
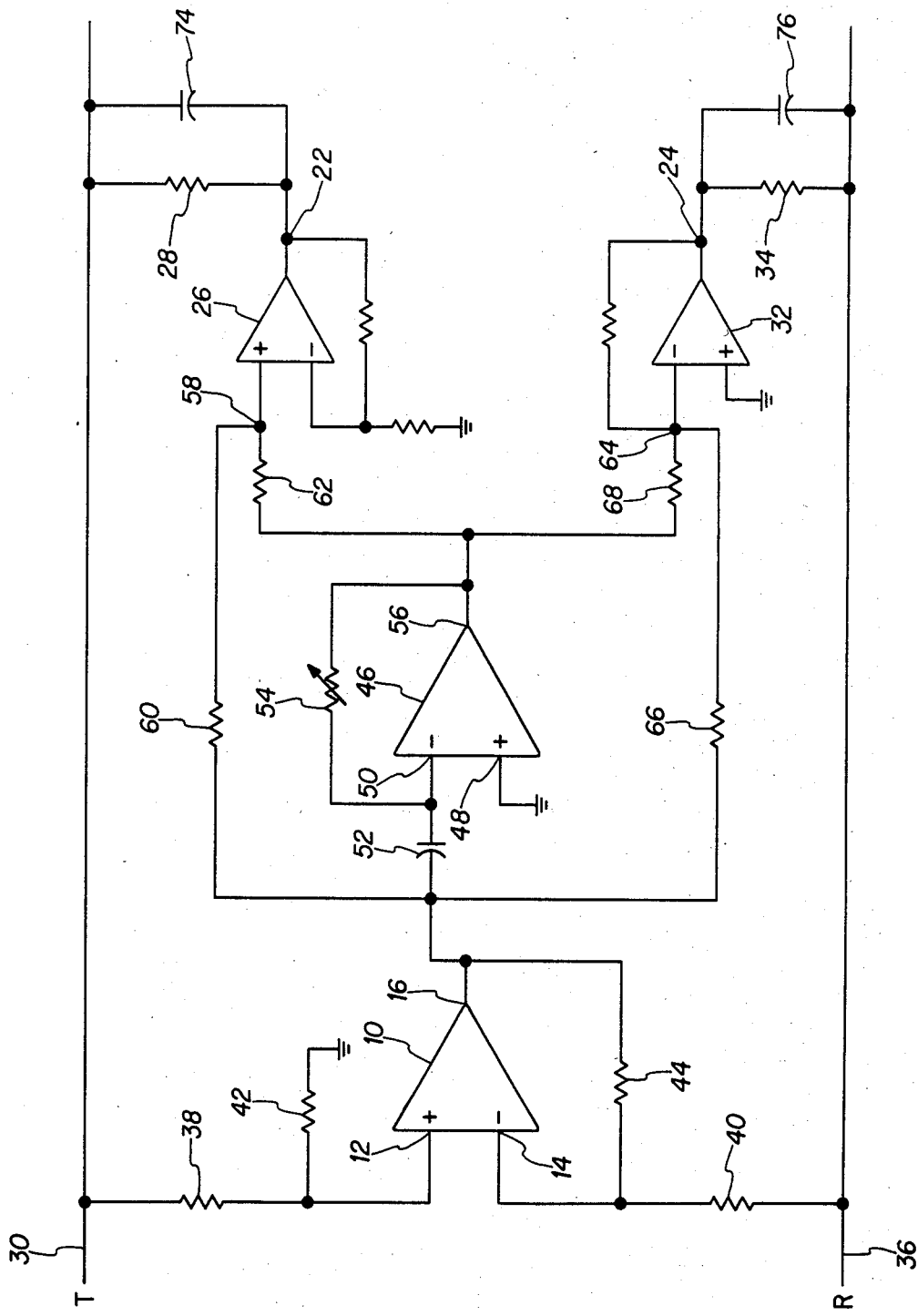
FIG. 2 is a circuit diagram implementing the present invention.

A preferred embodiment of the present invention is illustrated in FIG. 2 and shows a circuit diagram of an active network for providing a virtual impedance. More specifically, in the preferred embodiment the active network provides capacitance to a voice frequency loaded pair cable having tip and ring terminals 30 and 36. A differential amplifier such as first means 10 for comparing has a noninverting input 12 connected to the tip terminal 30 by resistor 38 and has an inverting input 14 connected to the ring terminal 36 by resistor 40. Resistor 42 is connected between the noninverting input 12 and ground and resistor 44 is connected between the inverting input 14 and the output 16 to provide the proper feedback.

A transfer function means such as second means 46 for comparing has a noninverting input 48 connected to ground and an inverting input 50 connected by capacitor 52 to the output 16 of the first means 10. An adjustable feedback resistor 54 is connected between the inverting input 50 and an output 56 of the second means 46. A first resistive network is operatively connected between the output 16 of the first means 10, the output 56 of the second means 46 and a tip output terminal 58. The first resistive network consists of resistors 60 and 62 as shown. A second resistive network is operatively connected between the output 16 and the output 56 and a ring output terminal 64. The second resistive network consists of resistors 66 and 68, as shown.

Amplifier means 26 is connected in series with first resistor 28 between the tip output 58 and the tip terminal 30. Inverter means 32 is connected in series with second resistor 34 between the ring output 64 and the ring terminal 36. Capacitors 74 and 76 are connected across resistors 28 and 34, respectively, to suppress oscillations. The equivalent impedance between tip and ring terminals can be computed as follows:

$$Z_{T-R} = \frac{V_{T-R}}{I_{T-R}} = \frac{V_{T-R}}{V_{T-R} - V_{T-R} + \frac{V_{T-R}R_{54}C_{52}S}{R_{28} + R_{34}}} = \frac{R_{28} + R_{34}}{R_{54}C_{52}S}$$

$$C_{T-R} = \frac{R_{54}C_{52}}{R_{28} + R_{34}}$$

Where $V_{T-R}$ is a differential voltage between tip and ring.

The invention is not limited to the particular details of the apparatus depicted and other modifications and applications are contemplated. Certain other changes may be made in the above described apparatus without departing from the true spirit and scope of the invention herein involved. It is intended therefore, that the subject matter in the above depiction shall be interpreted as illustrative and not in a limiting sense.

What is claimed is:

1. An active network for providing a virtual impedance to tip and ring terminals, said network comprising:
    first means for comparing having a noninverting input operatively connected to the tip terminal and an inverting input operatively connected to the ring terminal and having an output;
    second means for comparing having a noninverting input operatively connected to ground and an inverting input operatively connected by a fixed capacitor to said output of said first means for comparing, said second means having an adjustable resistance operatively connected between said inverting input of said second means and an output of said second means for comparing;
    first and second resistive networks having a tip output and a ring output, respectively, said first resistive network operatively connected between said output of said first means, said output of said second means and said tip output and said second resistive network operatively connected between said output of said first means, said output of said second means and said ring output, respectively;
    amplifier means operatively connected in series with a first resistor between said tip output of said second means and the tip terminal; and
    inverter means operatively connected in series with a second resistor between said ring output of said second means and the ring terminal.

2. The apparatus described in claim 1 wherein said first resistive network means comprises a first resistor connected between said output of said first means and said tip output and a second resistor connected between said output of said second means and said tip output.

3. The apparatus described in claim 1 wherein said second resistive network means comprises a resistor connected between said output of said first means and said ring output and a resistor connected between said output of said second means and said ring output.

* * * * *